United States Patent
Pezeshki et al.

(10) Patent No.: US 11,646,838 B2
(45) Date of Patent: May 9, 2023

(54) BROADCASTING KNOWN DATA TO TRAIN ARTIFICIAL NEURAL NETWORKS

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US); Jingchao Bao, San Diego, CA (US); Ajay Gupta, San Diego, CA (US); Taesang Yoo, San Diego, CA (US); Vinod Viswanatha Menon, San Diego, CA (US); Wooseok Nam, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 240 days.

(21) Appl. No.: 17/176,755

(22) Filed: Feb. 16, 2021

(65) Prior Publication Data
US 2021/0266125 A1    Aug. 26, 2021

Related U.S. Application Data

(60) Provisional application No. 62/980,070, filed on Feb. 21, 2020.

(51) Int. Cl.
| | |
|---|---|
| *H04L 5/00* | (2006.01) |
| *H04L 12/18* | (2006.01) |
| *H04W 76/28* | (2018.01) |
| *H04W 4/06* | (2009.01) |

(Continued)

(52) U.S. Cl.
CPC .......... *H04L 5/0044* (2013.01); *H04L 12/189* (2013.01); *H04W 4/06* (2013.01); *H04W 72/30* (2023.01); *H04W 76/28* (2018.02)

(58) Field of Classification Search
None
See application file for complete search history.

(56) References Cited

U.S. PATENT DOCUMENTS

| | | |
|---|---|---|
| 2014/0226552 A1 | 8/2014 | Niu et al. |
| 2019/0274108 A1* | 9/2019 | O'Shea ............... G06N 3/0445 |
| 2019/0303176 A1 | 10/2019 | John |

(Continued)

FOREIGN PATENT DOCUMENTS

EP    3483794 A1    5/2019

OTHER PUBLICATIONS

International Search Report and Written Opinion—PCT/US2021/018419—ISA/EPO—dated May 17, 2021.

*Primary Examiner* — Diane L Lo
(74) *Attorney, Agent, or Firm* — Seyfarth Shaw LLP

(57) ABSTRACT

A method of wireless communication, executed by a user equipment (UE), receives, from a base station, a broadcast or multicast message including a known payload, as well as a configuration for the known payload. The method also trains an artificial neural network with the known payload. A method of wireless communication, executed by a base station, configures a known payload for multiple UEs and signals, to the UEs, an indication of which physical channel will include the known payload, as well as time/frequency resources of the known payload. The method also broadcasts or multicasts the known payload to facilitate neural network training at the UEs.

28 Claims, 9 Drawing Sheets

(51) Int. Cl.
*H04W 36/00* (2009.01)
*H04W 72/30* (2023.01)

(56) References Cited

U.S. PATENT DOCUMENTS

2021/0160149 A1* 5/2021 Ma .......................... G06N 3/006
2021/0342687 A1* 11/2021 Wang ................... G06N 3/0445
2022/0095367 A1* 3/2022 Kim .................. H04W 74/0833
2022/0159641 A1* 5/2022 Kim ..................... H04W 24/10

* cited by examiner

BROADCASTING KNOWN DATA TO TRAIN ARTIFICIAL NEURAL NETWORKS

CROSS-REFERENCE TO RELATED APPLICATION

The present application claims the benefit of U.S. Provisional Patent Application No. 62/980,070 filed on Feb. 21, 2020, and titled "BROADCASTING KNOWN DATA TO TRAIN ARTIFICIAL NEURAL NETWORKS," the disclosure of which is expressly incorporated by reference herein it its entirety.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in NR and LTE technologies. Preferably, these improvements should be applicable to other multiple access technologies and the telecommunication standards that employ these technologies.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

According to an aspect of the present disclosure, a method of wireless communication, executed by a user equipment (UE), receives, from a base station, a configuration for a known payload that is common to multiple UEs. The method may receive, from the base station, a message including the known payload. The method may also perform online training of a machine learning model with the known payload.

In another aspect, a method of wireless communication, executed by a base station, configures a known payload for multiple UEs and signals an indication to the UEs of which physical channel will include a known payload, and time/frequency resources of the known payload. The method also transmits, to the UEs, the known payload to train machine learning models at the UEs.

According to an aspect of the present disclosure, an apparatus of a UE for wireless communication has a memory and at least one processor coupled to the memory and configured to receives, from a base station, a configuration for a known payload that is common to multiple UEs. The processor(s) is also configured to receive, from the base station, a message including the known payload. The processor(s) is also configured to perform online training of a machine learning model with the known payload.

According to another aspect of the present disclosure, an apparatus for a base station for wireless communication has a memory and at least one processor coupled to the memory and is configured configure a known payload for multiple UEs and signal an indication to the UEs of which physical channel will include a known payload, and time/frequency resources of the known payload. The processor(s) is also configured to transmit, to the UEs, the known payload to train machine learning models at the UEs.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
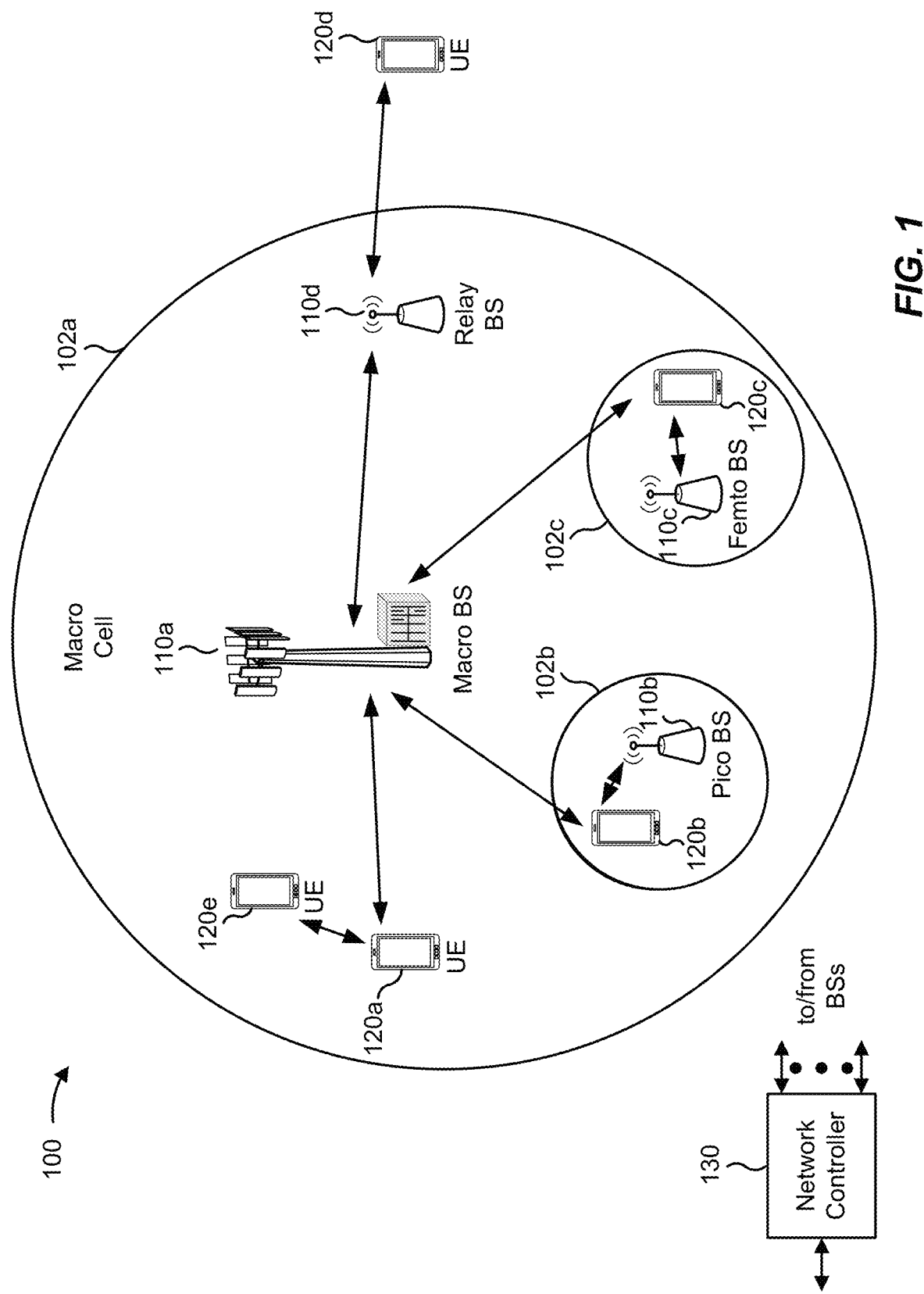
FIG. 1 is a block diagram conceptually illustrating an example of a wireless communication network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communication systems, such as and including 3G and/or 4G technologies.

Artificial intelligence (AI)/machine learning (ML) algorithms, such as those including artificial neural networks, can improve wireless communications. An AI/ML module may run at the UE, the base station or in the case of distributed algorithms, jointly across the UE and base station.

In order to achieve useful results, the neural networks executing the AI/ML algorithms need to be trained. Offline training of the neural networks can derive weights and biases of the neural network from training data. Offline training, however, does not account for the dynamic real world environment of the wireless communications. Online training accounts for the dynamic environment, including conditions for which the neural network was not trained. Online training may be accomplished with known over-the-air transmissions (or signaling) reflective of the wireless environment. For an online training procedure, instead of initiating training from scratch, training may start with the values for weights and biases derived from the offline training phase, and further fine-tune the neural network with regard to wireless channels, noise, and/or other environmental characteristics.

Reference signals, such as demodulation reference signals (DMRSs), channel state information reference signals (CSI-RSs), etc., are known transmissions. Reference signals, however, may not provide the appropriate type of information for some types of machine learning models. According to aspects of the present disclosure, known data transmissions are provided for certain machine learning models, such as for log-likelihood ratio (LLR) computation, MIMO demapping, etc. Known data transmissions may include, for example, known payloads of a physical downlink control channel (PDCCH), physical uplink control channel (PUCCH), physical downlink shared channel (PDSCH), and/or physical uplink shared channel (PUSCH). The known data transmissions may be multicast or broadcast to multiple UEs.

FIG. 1 is a diagram illustrating a network 100 in which aspects of the present disclosure may be practiced. The network 100 may be a 5G or NR network or some other wireless network, such as an LTE network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
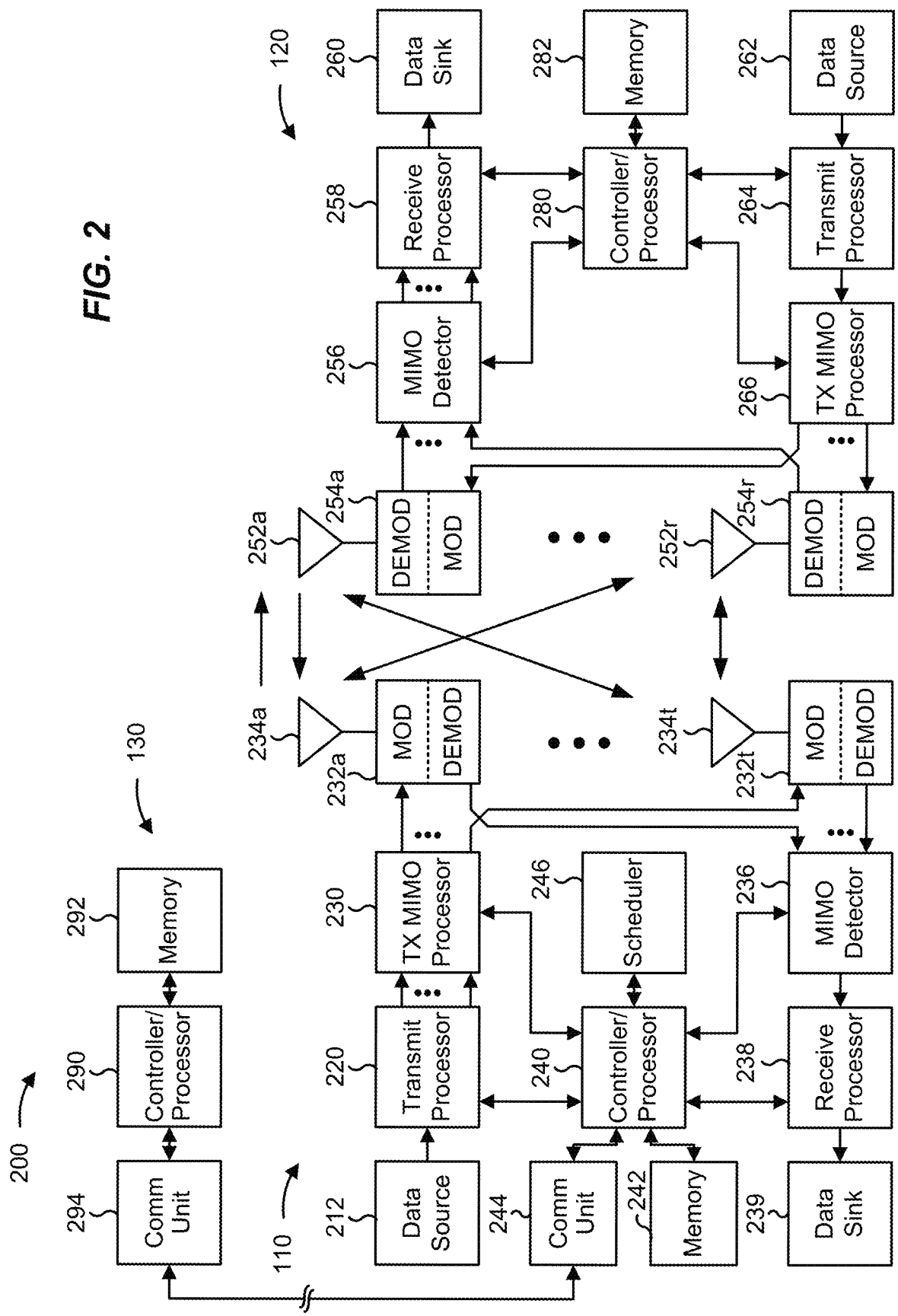
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 254, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with neural network training based on known payloads, as described in more detail elsewhere. For example, controller/processor 240 of base station 110, controller/processor 280 of UE 120, and/or any other component(s) of FIG. 2 may perform or direct operations of, for example, the processes 700, 800 of FIGS. 7 and 8 and/or other processes as described. Memories 242 and 282 may store data and program codes for base station 110 and UE 120, respectively. A scheduler 246 may schedule UEs for data transmission on the downlink and/or uplink.

In some aspects, UE 120 or base station 110 may include means for receiving, means for performing online training, means for configuring, means for signaling, and means for transmitting. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communication (URLLC) applications, massive machine-type communication (mMTC) applications, enhanced mobile broadband (eMBB) applications, vehicle-to-anything (V2X) applications, and/or the like. Furthermore, in some cases, a single device may support different applications or services simultaneously.

Figure 3:
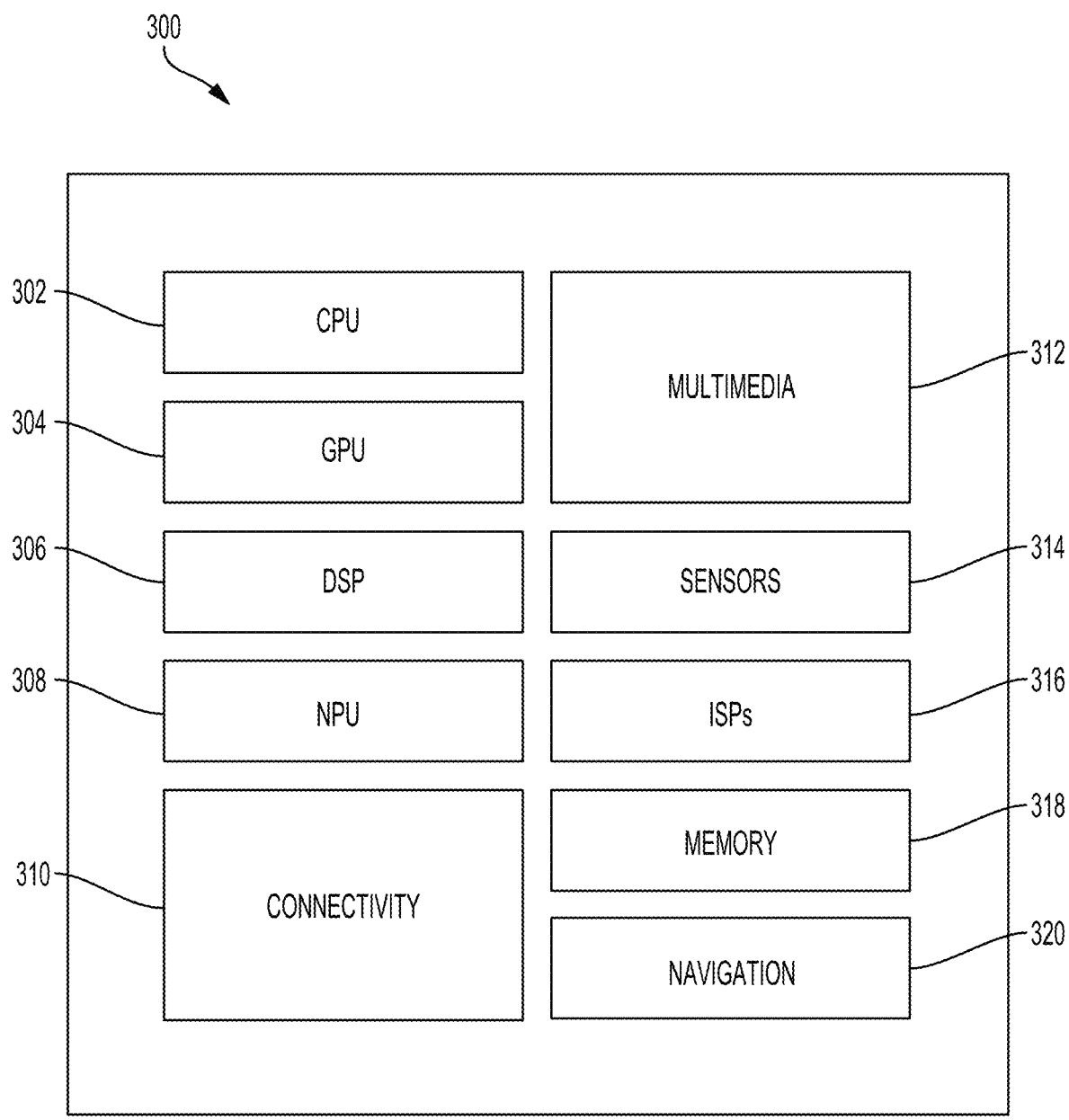
FIG. 3 illustrates an example implementation of designing a neural network using a system-on-a-chip (SOC), including a general-purpose processor in accordance with certain aspects of the present disclosure.

FIG. 3 illustrates an example implementation of a system-on-a-chip (SOC) 300, which may include a central processing unit (CPU) 302 or a multi-core CPU configured for training based on broadcast or multicast known payloads, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to receive a configuration for a known payload that is common to multiple UEs, code to receive a message including the known payload, and code to perform online training of a machine learning model with the known payload. The instructions loaded into the general-purpose processor 302 may also comprise code to configure a known payload for a plurality of UEs, code to signal to the UEs an indication of which physical channel will include the known payload, and time/frequency resources of the known payload, and code to transmit to the UEs the known payload to enable the UEs to train local machine learning models.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
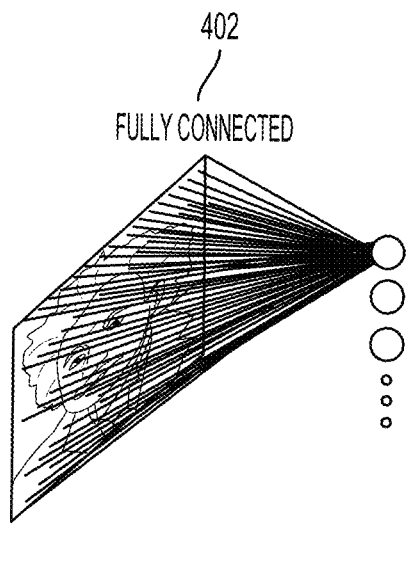
FIGS. 4A, 4B, and 4C are diagrams illustrating a neural network in accordance with aspects of the present disclosure.
Figure 4B:
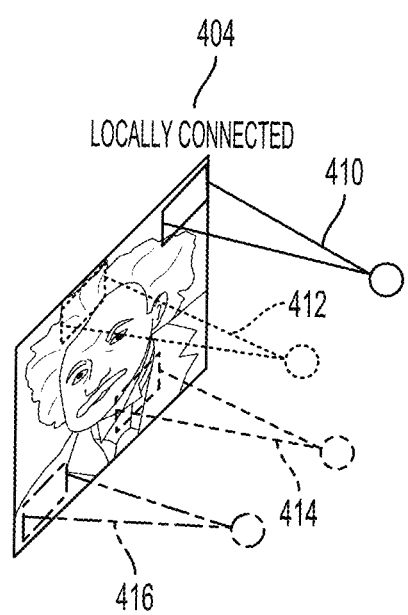

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
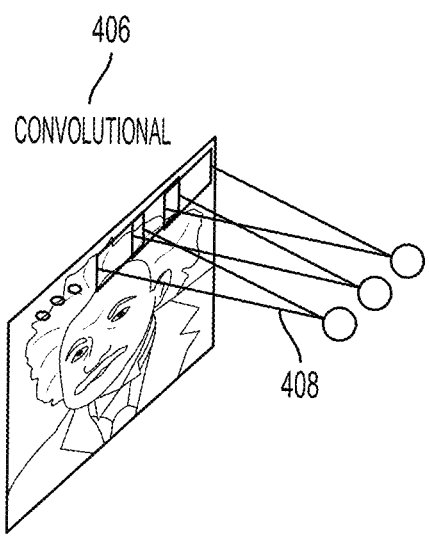

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
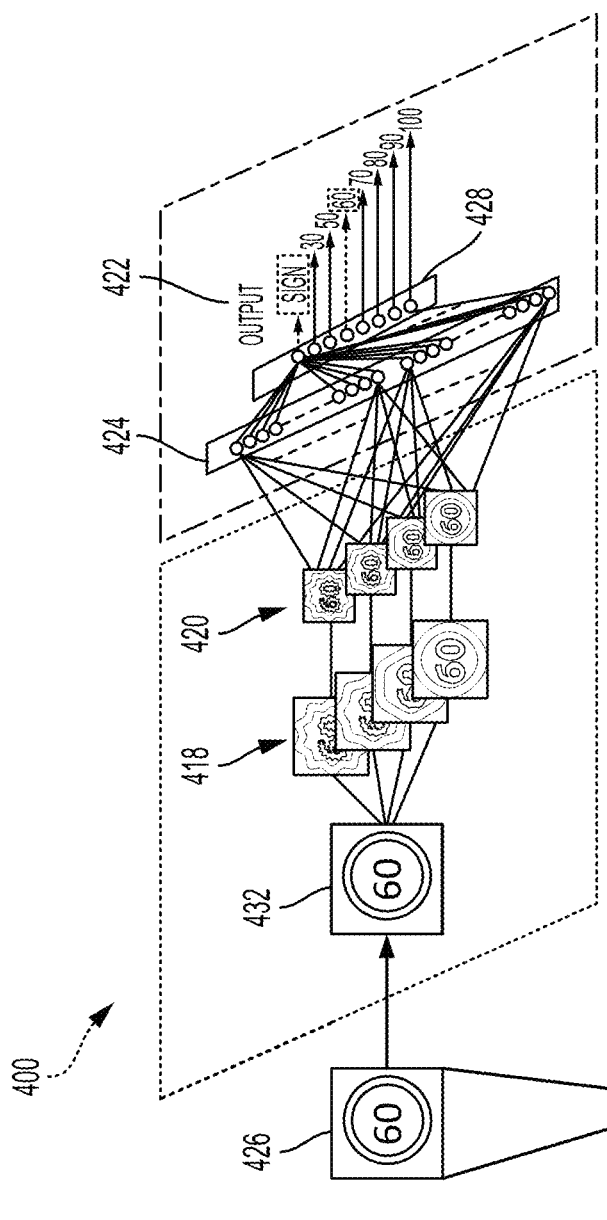
FIG. 4D is a diagram illustrating an exemplary deep convolutional network (DCN) in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
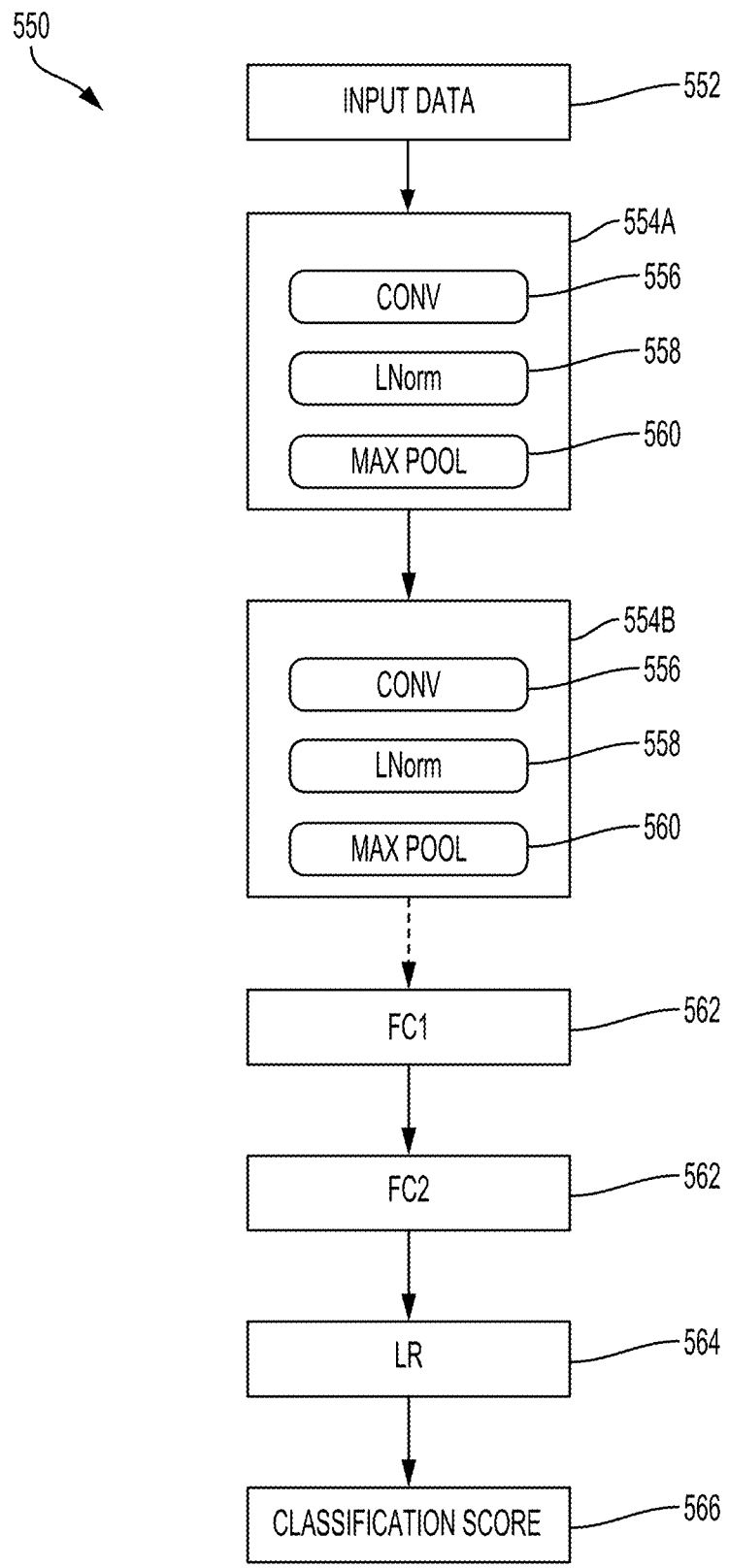
FIG. 5 is a block diagram illustrating an exemplary deep convolutional network (DCN) in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

As described above, artificial intelligence (AI)/machine learning (ML) algorithms can improve wireless communications. An AI/ML module may run at the UE, the base station or in the case of distributed algorithms, jointly across the UE and base station. Although the present disclosure generally refers to the AI module on the UE side, the present disclosure also contemplates an auto encoder scenario where joint training occurs.

In order to achieve useful results, the neural network executing the AI/ML algorithms needs to be trained. Offline training of the neural network can derive weights and biases of the neural network from training data. Offline training, however, does not account for the dynamic real world environment of the wireless communications. Online training accounts for the dynamic environment, including conditions for which the neural network was not trained. Online training may be accomplished with known over-the-air transmissions (or signaling) reflective of the wireless environment. For an online training procedure, instead of initiating training from scratch, training may start with the values for weights and biases derived from the offline training phase. The online training procedure then further fine-tunes the neural network with regard to wireless channels, noise, and/or other environmental characteristics.

Reference signals, such as demodulation reference signals (DMRSs), channel state information reference signals (CSI-RSs), etc., are known transmissions. Reference signals, however, may not provide the appropriate type of information for some types of machine learning models. Data transmissions may be desirable for certain machine learning models, such as for log-likelihood ratio (LLR) computation, MIMO demapping, etc. Known data transmissions may include, for example, known payloads of a physical downlink control channel (PDCCH), physical uplink control channel (PUCCH), physical downlink shared channel (PDSCH), and/or physical uplink shared channel (PUSCH).

A generalized machine learning (ML) model for a MIMO demapper may be represented, for example, as $y=Hx+n$, where y is the received vector, x is the transmitted symbol vector, n is the noise vector, and H is the channel matrix. The neural network (NN) may be trained offline to determine $\hat{x}$ (estimated symbols) and may benefit from fine-tuning with online training. The inputs to the neural network are received observations (y) and the estimated channel matrix (H), and the outputs are detected transmitted symbols, e.g., $\hat{x}$. In this case, the ground truth labels are the known payload used for training the neural network. Thus, the device (e.g., UE or gNB) may perform further online training, without having to decode y to use the decoded $\hat{x}$ as the ground truth labels for the neural network. Because the payloads are known, the machine learning model may use the training data to learn how to interpret the symbols in the presence of channel characteristics, noise characteristics, and/or the like.

The above examples are merely illustrative examples of how a known data transmission for the purpose of online training might be useful. The above examples generally apply in the context of unicast, where the base station specifically sends training data to a given UE (for example, with a given MIMO rank, MCS, etc.) to train its neural network. However, these examples are not limited to unicast. Moreover, the use case is not limited to a MIMO demapper. Other use cases are contemplated, such as with any other type of neural network.

According to aspects of the present disclosure, regular data transmissions may be treated as known once they have been decoded. Regular data transmissions include system information blocks (SIBs) that are known to repeat periodically (for example, in between boundaries when system information (SI) changes). Regular data transmissions may also include unicast transmissions, once the cyclic redundancy check (CRC) passes. Decoding regular data transmissions for training of the artificial neural networks, however, may use excessive memory and computation overhead, resulting in high latency. For example, received modulation symbols are stored until decoding completes, only after which the decoded symbols can be used for training purposes.

Thus, a mode may be desirable in which both the base station and UE know and/or agree in advance on the payload/content of certain physical channel transmissions. These known transmissions can be immediately used for ground truth labels in online training of a neural network.

For online training purposes, a signaling framework may enable UEs to train their respective neural networks. Sending a known payload that is known to both sides may be beneficial in a number of contexts, as the UE does not need to fully decode the payload to find the labels for training.

According to aspects of the present disclosure, a base station may transmit known data so that the UEs can use the data to train their neural networks. The transmissions may be either UE-specific, UE-group specific (for example, multicast), or true broadcast (e.g., to everyone in the cell).

Based on which type of neural network the UEs want to train, the UEs may need different types of data. Thus, a UE-specific known payload may be generated. Although the known payload includes data targeted for a specific UE (e.g., with a specific MCS and rank), the known payload can still be broadcast in case other UEs have a need for the same type of data. Multicasting may be appropriate if a base station would like to train a particular group of UEs. Cell specific training may be implemented with a broadcast to all UEs within the cell.

According to aspects of the present disclosure, the known payload may be generated in a way so that the UE and base station can independently generate the known payload. For example, the known payload may be based on an RRC configured scrambling seed. In other aspects, the known payload may be based on any sequence known to both the UE and the base station.

In some aspects, a location of the known payload (e.g., on which physical channel) and the exact time-frequency resources (e.g., periodicity (aperiodic, semi-persistent, periodic), duration, and aggregation level (for PDCCH), payload size, etc.) of the known payload may be pre-configured. In other aspects, the base station explicitly signals the information about the known payload. The explicit signaling can be via RRC, a MAC-control element (CE), or via PDCCH.

Some non-limiting examples for known data locations include a physical broadcast channel (PBCH) payload, a PDSCH, and a PDCCH. The location for the known data may be selected based upon its purpose with the neural network.

The PBCH payload is broadcast in existing systems, and may be considered a known payload once decoded. The content of the payload will change over time (due to system frame number (SFN) changing), but the periodicity for the change is much larger than the synchronization signal block (SSB) periodicity. Thus, the UE can decode the PBCH and define the labels accordingly. The UE can use the ground truth labels for training until the PBCH payload updates due to the SFN changing.

PDSCH carries system information blocks (SIBs.) SIBs are known to repeat periodically (in between the boundaries when system information (SI) may change), similar to the PBCH payload mentioned above. Thus, the UE can decode the SIBs and use them for training until the SIBs change due to new SI.

Figure 6:
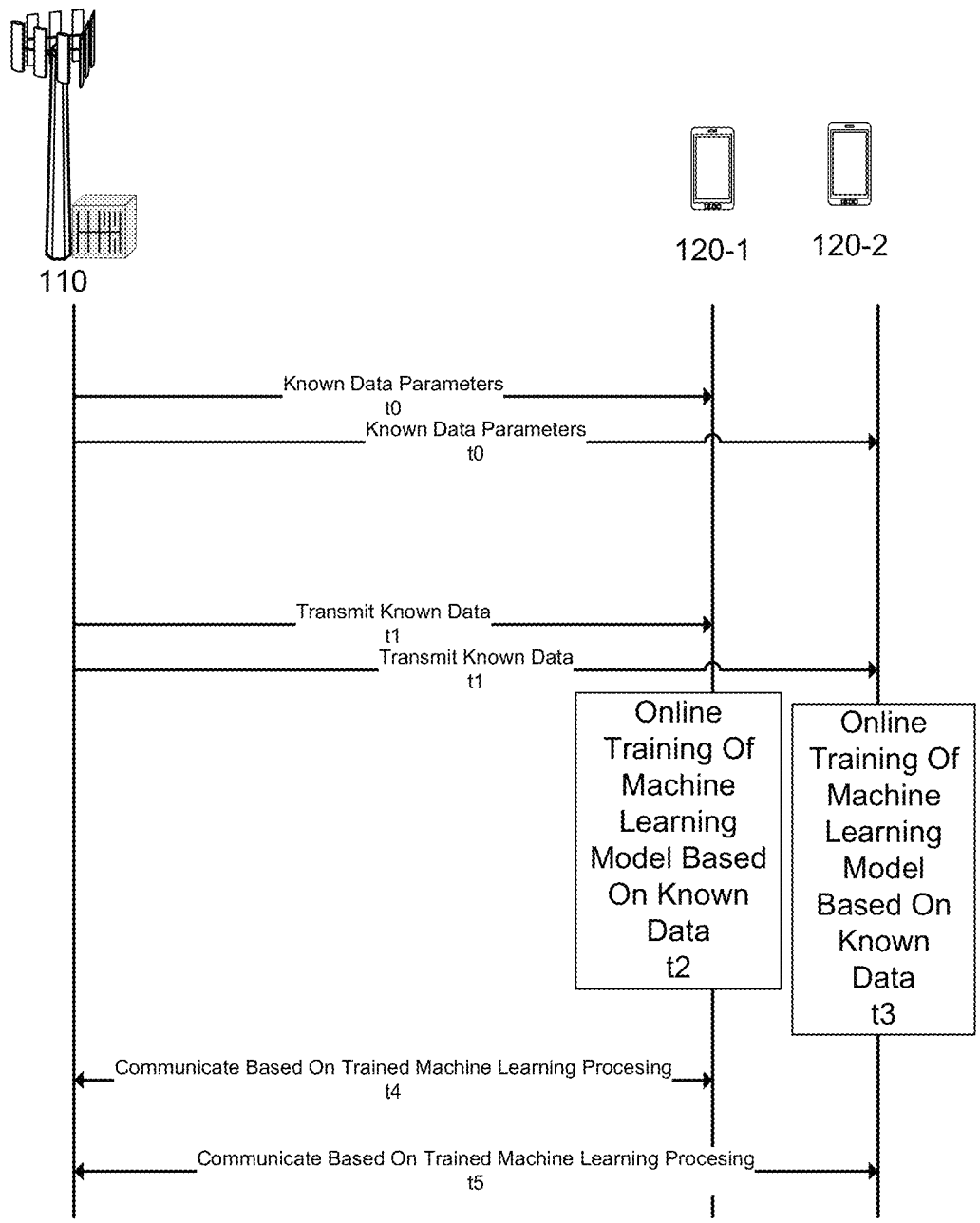
FIG. 6 is a timing diagram illustrating an example process performed, for example, by a UE and base station, in accordance with various aspects of the present disclosure.

PDCCH does not currently include a known payload. According to aspects of the present disclosure, the PDCCH may be defined with a known payload. The known payload may be configured for multicast or broadcast, if needed FIG. 6 is a timing diagram illustrating an example process performed, for example, by UEs 120-1, 120-2 and a base station 110, in accordance with various aspects of the present disclosure. Although FIG. 6 shows training at the UEs 120-1, 120-2 based on known data received from the base station 110, the opposite is also contemplated, where the base station 110 trains its neural network based on known data received from a UE 120.

At time t0, the base station 110 configures the UEs 120-1, 120-2 with a known payload, for example, a seed from which the known data is generated. In some implementations, the base station 110 uses RRC signaling to configure a scrambling seed for generating the known data. The base station 110 also signals an indication to the UEs 120-1, 120-2 of parameters for the known data, such as which physical channel will include a known payload, and time/frequency resources of the known payload. The base station 110 may broadcast or multicast the information to the UEs 120-1, 120-2.

At time t1, the base station 110 transmits the known data to the UEs 120-1, 120-2 based on the parameters. The base station 110 may broadcast or multicast the known data to the UEs 120-1, 120-2. At time t2, the UE 120-1 performs online training of its machine learning model based on the known data. At time t3, the UE 120-2 performs online training of its machine learning model based on the known data. At time t4, communication between the base station 110 and the UE 120-1 continues based on the trained machine learning model. For example, log-likelihood ratio (LLR) computations may be based on the trained machine learning model. At time t5, communication between the base station 110 and the UE 120-2 continues based on the trained machine learning model.

Figure 7:
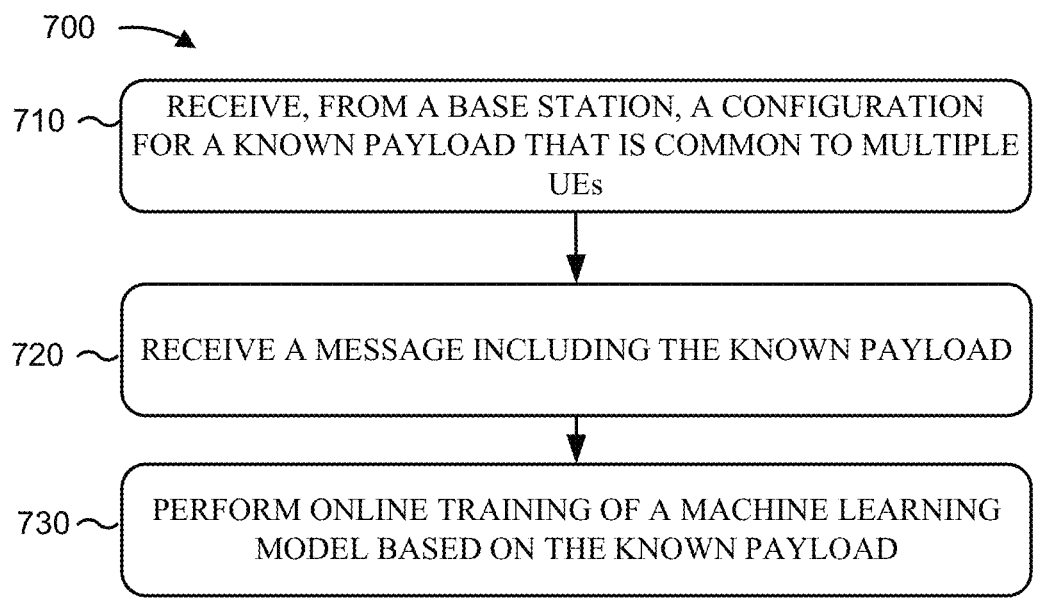
FIG. 7 is a flow diagram illustrating an example process performed, for example, by a user equipment, in accordance with various aspects of the present disclosure.

FIG. 7 is a flow diagram illustrating an example process 700 performed, for example, by a UE, in accordance with various aspects of the present disclosure. The example process 700 is an example of receiving a multicast or broadcast known payload, for example, for training machine learning models, such as artificial neural networks.

As shown in FIG. 7, in some aspects, the process 700 may include receiving, from a base station, a configuration for a known payload that is common to multiple UEs (block 720). For example, the UE (e.g., using the antenna 252, DEMOD 254, MIMO detector 256, receive processor 258, controller/processor 280, memory 282 and or the like) can receive the configuration. The process 700 may include receiving the known payload (block 720). For example, the UE (e.g., using the antenna 252, DEMOD 254, MIMO detector 256, receive processor 258, controller/processor 280, memory 282 and or the like) can receive the known payload. The known payload can be within the PBCH, PDCCH, or PDSCH, for example. The known payload may be received in a multicast message, or a broadcast message. Because the payload is known, the UE may not have to decode the payload to determine its sequence. Rather, the UE may generate the payload independently from the base station, for example, based on an RRC configured scrambling seed. The UE is aware of where the known payload is. This knowledge may be either pre-configured or signaled from the base station.

As shown in FIG. 7, in some aspects, the process 700 may include performing online training of the machine learning model, which may include an artificial neural network, with the known payload (block 730). For example, the UE (e.g., using controller/processor 280, the memory 282, and or the like) can train an artificial neural network with the known payload. The known payload may be used to generate ground truth labels for training the neural network.

Figure 8:
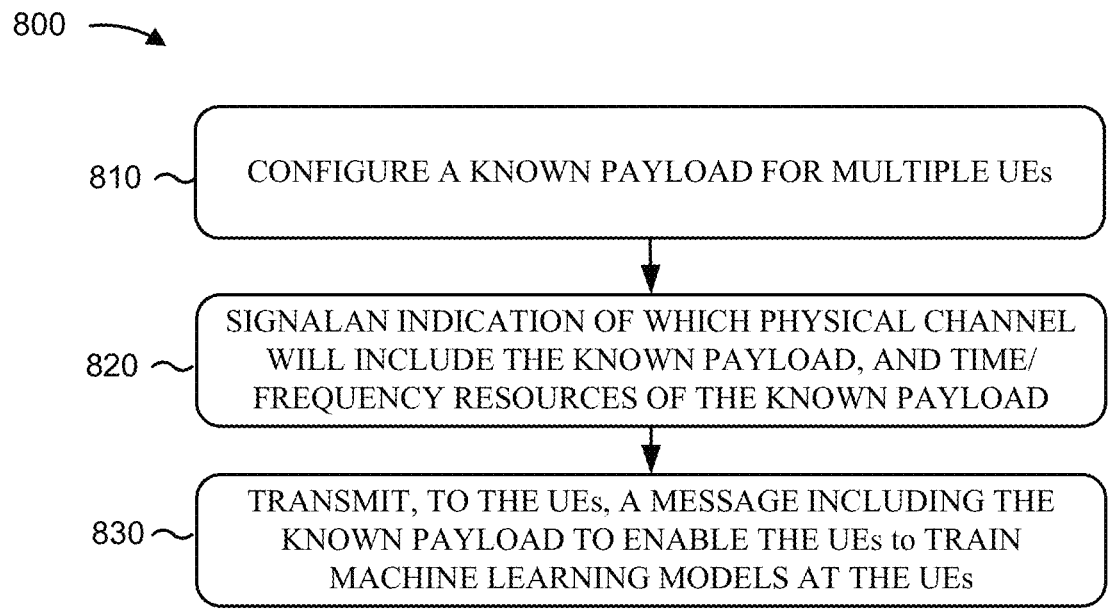
FIG. 8 is a flow diagram illustrating an example process performed, for example, by a base station, in accordance with various aspects of the present disclosure.

FIG. 8 is a flow diagram illustrating an example process 800 performed, for example, by a base station, in accordance with various aspects of the present disclosure. The example process 800 is an example of broadcasting or multicasting known data for training machine learning models, such as artificial neural networks.

As shown in FIG. 8, in some aspects, the process 800 may include configuring a known payload for multiple UEs (block 810). For example, the base station (e.g., using the antenna 234, MOD 232, MIMO processor 230, transmit processor 220, controller/processor 240, and memory 242, and or the like) can broadcast or multicast the configuration. The process 800 may include signaling an indication of which physical channel will include a known payload, and time/frequency resources of the known payload (block 820). For example, the base station (e.g., using the antenna 234, MOD 232, MIMO processor 230, transmit processor 220, controller/processor 240, and memory 242, and or the like) can broadcast or multicast an indication of which physical channel, e.g., PBCH, PDSCH, PDCCH, will include the known payload. The indication may also define the time/frequency resources, including periodicity, duration, payload size, and aggregation level in case of PDCCH transmission.

After sending the indication, the process 800 may transmit the known payload (block 830). For example, the base station (e.g., using the antenna 234, MOD 232, MIMO processor 230, transmit processor 220, controller/processor 240, and memory 242 and or the like) may broadcast the known payload on the PBCH or multicast the known payload to facilitate neural network training at the UEs.

Although FIGS. 6, 7 and 8 show example blocks of the processes 600, 700, 800 in some aspects, the processes 600, 700, 800 may include additional blocks, fewer blocks, different blocks, or differently arranged blocks than those depicted in FIGS. 6, 7, and 8. Additionally, or alternatively, two or more of the blocks of the processes 600, 700, 800 may be performed in parallel.

Implementation examples are described in the following numbered clauses:

1. A method of wireless communication by a user equipment (UE), comprising:
    receiving, from a base station, a configuration for a known payload, the known payload common to a plurality of UEs;
    receiving, from the base station, a message including the known payload; and
    performing online training of a machine learning model with the known payload.

2. The method of clause 1, in which the configuration comprises a radio resource control (RRC) configured scrambling seed.

3. The method of any of the preceding clauses, further comprising receiving an indication of where to receive the known payload, the indication being either pre-configured or received via radio resource control (RRC) signaling, a media access control (MAC) control element or a physical downlink control channel (PDCCH).

4. The method of any of the preceding clauses, in which the indication defines a periodicity, duration, aggregation level, and/or payload size of the known payload.

5. The method of any of the preceding clauses, in which the known payload is located in a physical broadcast channel (PBCH), a physical downlink shared channel (PDSCH), or a physical downlink control channel (PDCCH).

6. The method of any of the preceding clauses, in which the message comprises a multicast message.

7. The method of any of clauses 1-5, in which the message comprises a broadcast message.

8. A method of wireless communication by a base station, comprising:
    configuring a known payload for a plurality of user equipments (UEs);
    signaling, to the plurality of UEs, an indication of which physical channel will include the known payload, and time/frequency resources of the known payload; and
    transmitting, to the plurality of UEs, the known payload to enable the plurality of UEs to train machine learning models at the plurality of UEs.

9. The method of clause 8, in which transmitting comprises multicasting the known payload.

10. The method of clause 8, in which transmitting comprises broadcasting the known payload.

11. The method of any of clauses 8-10, in which the physical channel comprises a physical downlink control channel (PDCCH), a physical broadcast channel (PBCH), or a physical downlink shared channel (PDSCH) and the time/frequency resources comprise periodicity, duration, and payload size of the known payload.

12. The method of any of clauses 8-11, in which the known payload is defined within a physical downlink control channel (PDCCH).

13. The method of any of clauses 8-12, further comprising transmitting an message indicating where to receive the known payload, the message being either pre-configured or transmitted via radio resource control (RRC) signaling, a media access control (MAC) control element or a physical downlink control channel (PDCCH).

14. The method of any of clauses 8-13, in which configuring the known payload comprises transmitting a scrambling seed via radio resource control (RRC) signaling.

15. An apparatus of a user equipment (UE) for wireless communication, comprising:
    a memory; and
    at least one processor coupled to the memory and configured:
        to receive, from a base station, a configuration for a known payload that is common to a plurality of UEs;
        to receive, from the base station, a message including the known payload; and
        to train a machine learning model with the known payload.

16. The apparatus of clause 15, in which the configuration comprises a radio resource control (RRC) configured scrambling seed.

17. The apparatus of clause 15 or 16, in which the at least one processor is further configured to receive an indication of where to receive the known payload, the indication being either pre-configured or received via radio resource control (RRC) signaling, a media access control (MAC) control element or a physical downlink control channel (PDCCH).

18. The apparatus of any of clauses 15-17, in which the indication defines a periodicity, duration, aggregation level and/or payload size of the known payload.

19. The apparatus of any of clauses 15-18, in which the known payload is located in a physical broadcast channel (PBCH), a physical downlink shared channel (PDSCH), or a physical downlink control channel (PDCCH).

20. The apparatus of any of clauses 15-19, in which the message comprises a multicast message.

21. The apparatus of any of clauses 15-19, in which the message comprises a broadcast message.

22. An apparatus of a base station for wireless communication, comprising:
    a memory; and
    at least one processor coupled to the memory and configured:
        to configure a known payload for a plurality of user equipments (UEs);
        to signal, to the plurality of UEs, an indication of which physical channel will include the known payload, and time/frequency resources of the known payload; and
        to transmit, to the plurality of UEs, the known payload to enable the plurality of UEs to train machine learning models at the plurality of UEs.

23. The apparatus of clause 22, in which the at least one processor is configured to transmit the known payload by multicasting the known payload.

24. The apparatus of clause 22, in which the at least one processor is configured to transmit the known payload by broadcasting the known payload.

25. The apparatus of any of clauses 22-24, in which the physical channel comprises physical downlink control channel (PDCCH), physical broadcast channel (PBCH), or physical downlink shared channel (PDSCH) and the time/frequency resources comprise periodicity, duration, and payload size of the known payload.

26. The apparatus of any of clauses 22-25, in which the known payload is defined within a physical downlink control channel (PDCCH).

27. The apparatus of any of clauses 22-26, in which the at least one processor is further configured to send a message indicating where to receive the known payload, the message being either pre-configured or transmitted via radio resource control (RRC) signaling, a media access control (MAC) control element or a physical downlink control channel (PDCCH).

28. The apparatus of any of clauses 22-27, in which the at least one processor is further configured to configure the known payload by transmitting a scrambling seed via radio resource control (RRC) signaling.

29. An apparatus comprising at least one means for performing a method of any of clauses 1 to 14.

30. A non-transitory computer-readable medium storing code for wireless communications, the code comprising instructions executable by a processor to perform a method of any of clauses 1 to 14.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more."

Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
    receiving, from a base station, a configuration for a known payload, the known payload common to a plurality of UEs;
    receiving, from the base station, a message including the known payload, the known payload comprising a ground truth label that is known to the base station and known to the UE without decoding of the message; and
    performing online training of a machine learning model with the known payload.

2. The method of claim 1, in which the configuration comprises a radio resource control (RRC) configured scrambling seed.

3. The method of claim 1, further comprising receiving an indication of where to receive the known payload, the indication being either pre-configured or received via radio resource control (RRC) signaling, a media access control (MAC) control element or a physical downlink control channel (PDCCH).

4. The method of claim 3, in which the indication defines a periodicity, duration, aggregation level, and/or payload size of the known payload.

5. The method of claim 1, in which the known payload is located in a physical broadcast channel (PBCH), a physical downlink shared channel (PDSCH), or a physical downlink control channel (PDCCH).

6. The method of claim 1, in which the message comprises a multicast message.

7. The method of claim 1, in which the message comprises a broadcast message.

8. A method of wireless communication by a base station, comprising:
    configuring a known payload for a plurality of user equipments (UEs);
    signaling, to the plurality of UEs, an indication of which physical channel will include the known payload, and time/frequency resources of the known payload; and
    transmitting, to the plurality of UEs, the known payload to enable the plurality of UEs to train machine learning models at the plurality of UEs, the known payload comprising a ground truth label that is known to the base station and known to the plurality of UEs without decoding the known payload.

9. The method of claim 8, in which transmitting comprises multicasting the known payload.

10. The method of claim 8, in which transmitting comprises broadcasting the known payload.

11. The method of claim 8, in which the physical channel comprises a physical downlink control channel (PDCCH), a physical broadcast channel (PBCH), or a physical downlink shared channel (PDSCH) and the time/frequency resources comprise periodicity, duration, and payload size of the known payload.

12. The method of claim 8, in which the known payload is defined within a physical downlink control channel (PDCCH).

13. The method of claim 8, further comprising transmitting an message indicating where to receive the known payload, the message being either pre-configured or transmitted via radio resource control (RRC) signaling, a media access control (MAC) control element or a physical downlink control channel (PDCCH).

14. The method of claim 8, in which configuring the known payload comprises transmitting a scrambling seed via radio resource control (RRC) signaling.

15. An apparatus of a user equipment (UE) for wireless communication, comprising:
a memory; and
at least one processor coupled to the memory and configured:
to receive, from a base station, a configuration for a known payload that is common to a plurality of UEs;
to receive, from the base station, a message including the known payload, the known payload comprising a ground truth label that is known to the base station and known to the UE without decoding of the message; and
to train a machine learning model with the known payload.

16. The apparatus of claim 15, in which the configuration comprises a radio resource control (RRC) configured scrambling seed.

17. The apparatus of claim 15, in which the at least one processor is further configured to receive an indication of where to receive the known payload, the indication being either pre-configured or received via radio resource control (RRC) signaling, a media access control (MAC) control element or a physical downlink control channel (PDCCH).

18. The apparatus of claim 17, in which the indication defines a periodicity, duration, aggregation level and/or payload size of the known payload.

19. The apparatus of claim 15, in which the known payload is located in a physical broadcast channel (PBCH), a physical downlink shared channel (PDSCH), or a physical downlink control channel (PDCCH).

20. The apparatus of claim 15, in which the message comprises a multicast message.

21. The apparatus of claim 15, in which the message comprises a broadcast message.

22. An apparatus of a base station for wireless communication, comprising:
a memory; and
at least one processor coupled to the memory and configured:
to configure a known payload for a plurality of user equipments (UEs);
to signal, to the plurality of UEs, an indication of which physical channel will include the known payload, and time/frequency resources of the known payload; and
to transmit, to the plurality of UEs, the known payload to enable the plurality of UEs to train machine learning models at the plurality of UEs, the known payload comprising a ground truth label that is known to the base station and known to the plurality of UEs without decoding the known payload.

23. The apparatus of claim 22, in which the at least one processor is configured to transmit the known payload by multicasting the known payload.

24. The apparatus of claim 22, in which the at least one processor is configured to transmit the known payload by broadcasting the known payload.

25. The apparatus of claim 22, in which the physical channel comprises physical downlink control channel (PDCCH), physical broadcast channel (PBCH), or physical downlink shared channel (PDSCH) and the time/frequency resources comprise periodicity, duration, and payload size of the known payload.

26. The apparatus of claim 22, in which the known payload is defined within a physical downlink control channel (PDCCH).

27. The apparatus of claim 22, in which the at least one processor is further configured to send a message indicating where to receive the known payload, the message being either pre-configured or transmitted via radio resource control (RRC) signaling, a media access control (MAC) control element or a physical downlink control channel (PDCCH).

28. The apparatus of claim 22, in which the at least one processor is further configured to configure the known payload by transmitting a scrambling seed via radio resource control (RRC) signaling.

* * * * *